(12) United States Patent
Feinberg et al.

(10) Patent No.: US 10,449,904 B2
(45) Date of Patent: Oct. 22, 2019

(54) SAFETY PLATFORM

(71) Applicant: General Truck Body Manufacturing Co., Houston, TX (US)

(72) Inventors: Matthew Feinberg, Houston, TX (US); James A. Braden, Houston, TX (US); Abel Cruz, Houston, TX (US); Jorge Lopez, Houston, TX (US); Larry Munday, Houston, TX (US); Christopher Reynolds, Houston, TX (US); Ofelio Sosa, Houston, TX (US)

(73) Assignee: General Truck Body Manufacturing Co., Houston, TX (US)

( * ) Notice: Subject to any disclaimer, the term of this patent is extended or adjusted under 35 U.S.C. 154(b) by 0 days.

(21) Appl. No.: 14/884,226

(22) Filed: Oct. 15, 2015

(65) Prior Publication Data

US 2016/0108629 A1    Apr. 21, 2016

Related U.S. Application Data

(60) Provisional application No. 62/064,267, filed on Oct. 15, 2014.

(51) Int. Cl.
*B60R 3/02* (2006.01)
*B60R 3/00* (2006.01)
*E04G 27/00* (2006.01)

(52) U.S. Cl.
CPC .............. *B60R 3/007* (2013.01); *E04G 27/00* (2013.01)

(58) Field of Classification Search
CPC .................................. B60R 3/007; B60R 3/02
See application file for complete search history.

(56) References Cited

U.S. PATENT DOCUMENTS

| | | | | |
|---|---|---|---|---|
| 4,042,064 | A * | 8/1977 | Lobb ........................ | E01F 1/00 |
| | | | | 182/115 |
| 4,347,638 | A * | 9/1982 | Weaver ..................... | B60R 3/02 |
| | | | | 14/71.1 |
| 5,064,023 | A * | 11/1991 | Loeber ...................... | B60R 3/00 |
| | | | | 182/127 |
| 5,076,547 | A * | 12/1991 | Osterholm .............. | E04F 11/18 |
| | | | | 256/67 |
| 5,653,459 | A * | 8/1997 | Murphy .................. | B60R 3/007 |
| | | | | 182/113 |
| 5,711,555 | A * | 1/1998 | Leedy ................... | E05C 19/184 |
| | | | | 292/202 |

(Continued)

*Primary Examiner* — Alvin C Chin-Shue
(74) *Attorney, Agent, or Firm* — Osha Liang LLP

(57) ABSTRACT

A safety platform includes a sliding frame capable of attaching to a unit, and a deck having at least one deck side. The deck is movable between a stowed position and a deployed position. The safety platform further includes a stair, ladder, or ramp operatively connected to the at least one deck side and capable of extending therefrom, at least one vertical post member connected to the deck, a handrail operatively connected to the at least one vertical post member, and a vertical toeboard operatively connected to the at least one deck side, excluding a portion of the deck operatively connected to the stair, ladder, or ramp. The handrail is configured to extend along and parallel to an outer side of the stair, ladder, or ramp, and the at least one deck side, excluding a portion of the deck operatively connected to the stair, ladder, or ramp.

12 Claims, 11 Drawing Sheets

(56) References Cited

U.S. PATENT DOCUMENTS

| | | | | |
|---|---|---|---|---|
| 6,810,995 B2* | 11/2004 | Warford | ............... | E04F 11/025 182/113 |
| 6,905,110 B2* | 6/2005 | Brown | ............... | E04F 11/1812 248/519 |
| 7,025,174 B1* | 4/2006 | Hawley | ................. | E06C 5/04 182/127 |
| 8,251,177 B2* | 8/2012 | Watt | .................. | B66F 11/04 182/141 |
| 2014/0239609 A1* | 8/2014 | Robertson | ............... | B60R 3/02 280/166 |

\* cited by examiner

SAFETY PLATFORM

FIELD OF THE DISCLOSURE

Embodiments disclosed herein relate to an apparatus that includes a platform. More specifically, embodiments disclosed herein relate to a safety platform for use in accessing or egressing a unit, where the safety platform may be moveable from a stowed position to a deployed position.

BACKGROUND

In the drilling and construction industry, there has been no way to stow and deploy a platform for personnel to safely access and egress an entry elevated above grade, for example, to a mobile trailer unit. Conventionally, a stair or ramp may be provided between the grade and the elevated entry threshold for access and egress, however conventionally provided stairs or ramps are lacking in safety components to prevent personnel from falling to a lower elevation or to grade and the ability to stow compactly. Personnel frequently carry small tools in the field thus making access and egress of an entry elevated above grade more difficult and less safe, especially when small tools are dropped and require retrieval.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In one aspect, embodiments disclosed herein relate to a safety platform that includes a sliding frame having a distal end capable of attaching to a unit and a proximal end configured to slide horizontally towards and away from the distal end, and a deck having a plurality of sides that includes a rear side and at least one deck side, wherein the at least one deck side is adjacent the rear side, and wherein the at least one deck side furthest from the rear side is a front side. The deck is movable between a stowed position and a deployed position, the stowed position having the front side of the deck being substantially flush with an outer surface of the unit, and the deployed position having the front side of the deck a distance from the outer surface of the unit. The safety platform further includes a stair, ladder, or ramp operatively connected to the at least one deck side and capable of extending therefrom, at least one vertical post member connected to the deck proximate the front side, a handrail operatively connected to the at least one vertical post member, and a vertical toeboard operatively connected to the at least one deck side, excluding a portion of the deck operatively connected to the stair, ladder, or ramp. The stair, ladder, or ramp includes an inner side facing the unit and an outer side opposite the inner side. The handrail is configured to extend along and parallel to the outer side of the stair, ladder, or ramp, and the at least one deck side, excluding a portion of the deck operatively connected to the stair, ladder, or ramp.

In another aspect, embodiments disclosed herein relate to a method of deploying a safety platform from a unit that includes pulling a platform deck outwardly a distance from the unit. The platform deck has a plurality of sides that includes a rear side operatively connected to the unit, and at least one deck side, wherein the at least one deck side is adjacent the rear side, and wherein the at least one deck side furthest from the rear side is a front side. The method further includes extending a stair, ladder, or ramp from the at least one deck side, extending a handrail from at least one vertical post member operatively connected to the platform deck proximate the front side, the handrail extending along the outer side of the stair, ladder, or ramp, and the at least one deck side, and extending a vertical toeboard from the at least one deck side. The stair, ladder, or ramp includes an inner side facing the unit and an outer side opposite the inner side.

In yet another aspect, embodiments disclosed herein relate to a method of retrofitting a unit to stow a safety platform in a stowed position that includes forming an opening in a side surface of the unit, securing a sliding frame to a support within the unit such that the sliding frame is capable of sliding outwardly through the opening a distance, extending the sliding frame a distance through the opening, attaching a safety platform in the stowed position to a top surface of the sliding frame, and urging the safety platform inwardly through the opening such that the safety platform is substantially inside the unit. The safety platform includes a platform deck, a stair, ladder, or ramp configured to extend from an access side of the platform deck, a deck handrail and a deck midrail configured to extend along all sides of the platform deck excluding the access side of the platform deck, a secondary handrail and a secondary midrail configured to extend along a side of the stair, ladder, or ramp, and a toeboard configured to extend vertically along all sides of the platform deck, excluding at least a portion of the access side of the platform deck adjacent the stair, ladder, or ramp.

Other aspects and advantages of the claimed subject matter will be apparent from the following description and the appended claims.

DETAILED DESCRIPTION

Embodiments of the present disclosure will be described below with reference to the figures. In one aspect, embodiments disclosed herein relate to safety platforms. More specifically, the present disclosure relates to a platform with safety components capable of being stowed and deployed from a unit, for example, in the drilling or construction industry, such that personnel may access and egress from an elevated space of the unit above grade.

As mentioned above, units having door openings present various hazards to the safety of users, including falls as well as impact from dropped objects due to the elevation of the doorway with respect to grade. Accordingly, a unit as described herein may be any structure that includes one or more doorways for accessing and egressing the unit, whereby the doorways are elevated above grade or ground level. In one or more embodiments, a unit as described herein, may be a mobile trailer unit. In alternative embodiments, a unit may be a non-mobile trailer unit. Embodiments disclosed herein provide at least platforms, railings, toeboards, and a stair, ladder, or ramp for safely accessing and egressing from an elevation above grade, for example, a doorway of a mobile trailer unit.

The embodiments disclosed herein may provide a safer means of accessing a doorway of a unit by virtue of the components included in the one or more safety platforms described herein. Such components may include in one or more embodiments, without limitation, a handrail, midrail, any one of at least a stair, ladder, or ramp, one or more stabilizer support legs, and a deck that are coupled to a safety platform for use when accessing or egressing a unit. Additionally, when not deployed, the components included in the one or more safety platforms may be stowed compactly in a designated storage area on and/or within the unit. Further, one or more embodiments described herein provides for a safety platform that stays fixed and secure in a stowed position while a unit is transported from one site to another.

Figure 1:
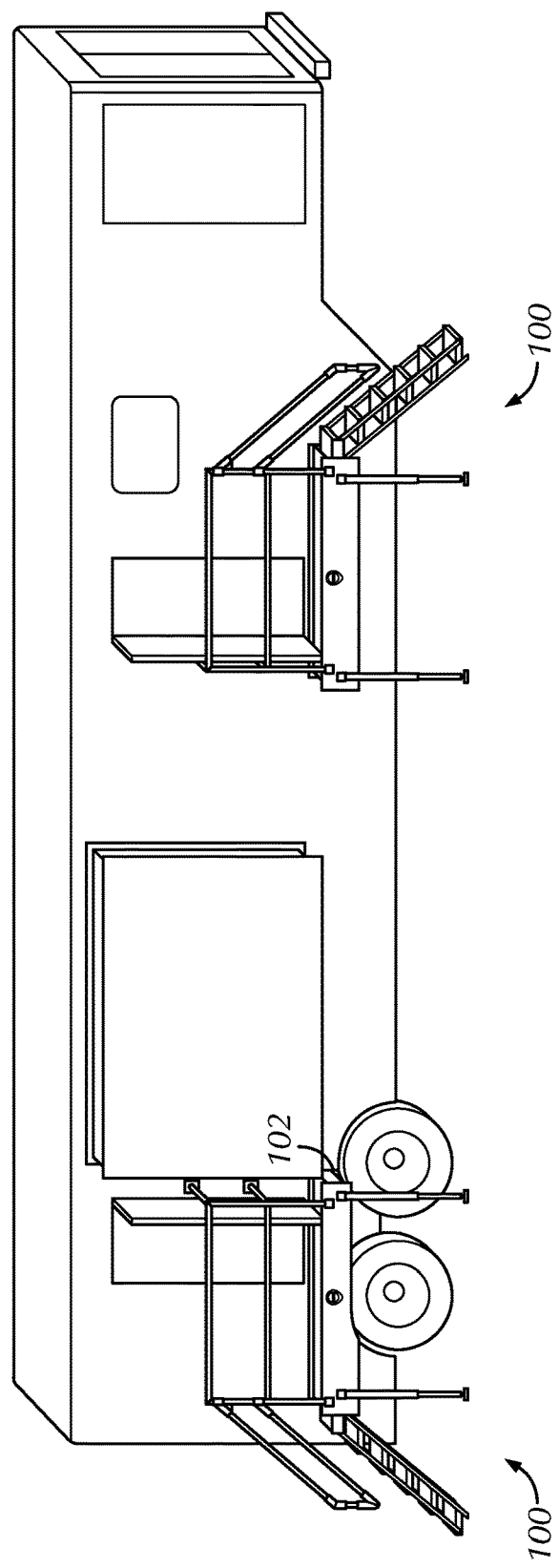
FIG. 1 shows a perspective view of a plurality of safety platforms in a deployed position according to embodiments of the present disclosure.
Figure 2:
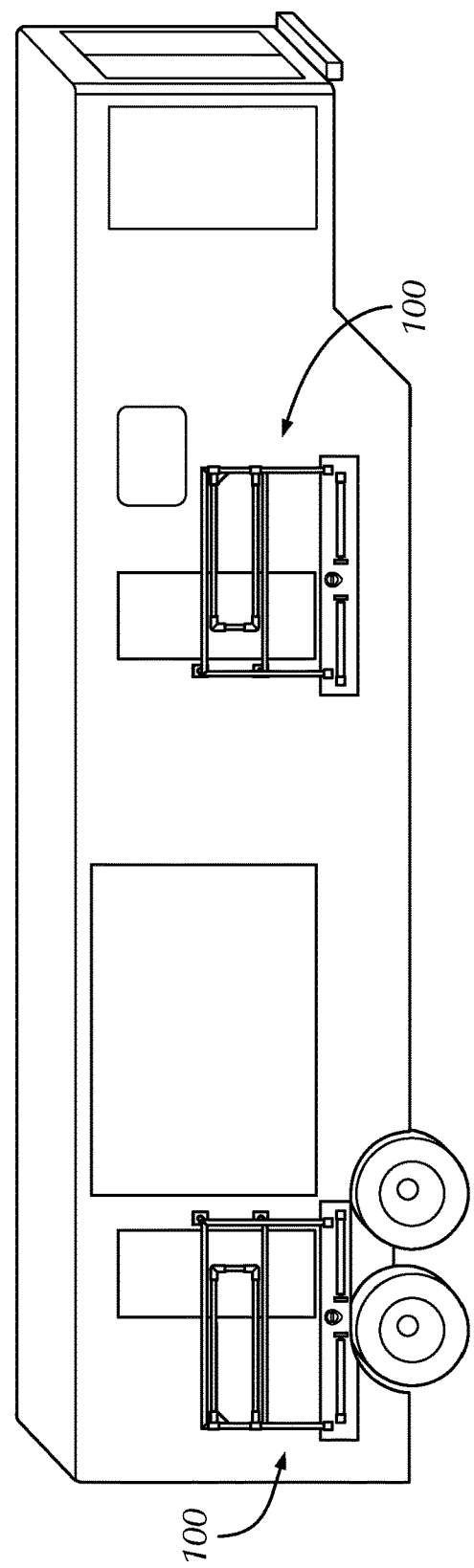
FIG. 2 shows a perspective view of a plurality of safety platforms in a stowed position according to embodiments of the present disclosure

FIG. 1 illustrates a perspective view of a plurality of safety platforms 100 in accordance with embodiments herein in a deployed position. FIG. 2 illustrates a perspective view of a plurality of safety platforms 100 in accordance with embodiments herein in a stowed position. Safety components, including but not limited to, a deck 120, a stair, ladder, or ramp 130, a handrail 150, a midrail 152, and a toeboard 160, are each capable of moving between a deployed position and a stowed position, corresponding with a deployed position and a stowed position of safety platform 100 as shown in FIGS. 1 and 3 and FIGS. 2 and 4, respectively. Embodiments of the present disclosure are capable of stowing in a position that is substantially flush with an outer surface of the unit 172 to be accessed via safety platform 100. In the example of the safety platform 100 used with a mobile trailer unit 172, as shown in FIG. 2, safety platform 100 is capable of moving to stowed position such that the profile of the mobile trailer unit 172 is substantially unchanged and such that the mobile trailer unit 172 may transport as normal.

As shown in FIG. 1 and FIG. 2, in one or more embodiments, safety platform 100 may be configured to allow access or egress from a right or left hand side of a doorway of a unit 172. Safety platform 100 may be positioned and designed to accommodate the form and shape of the outer surface of a unit 172.

Figure 3:
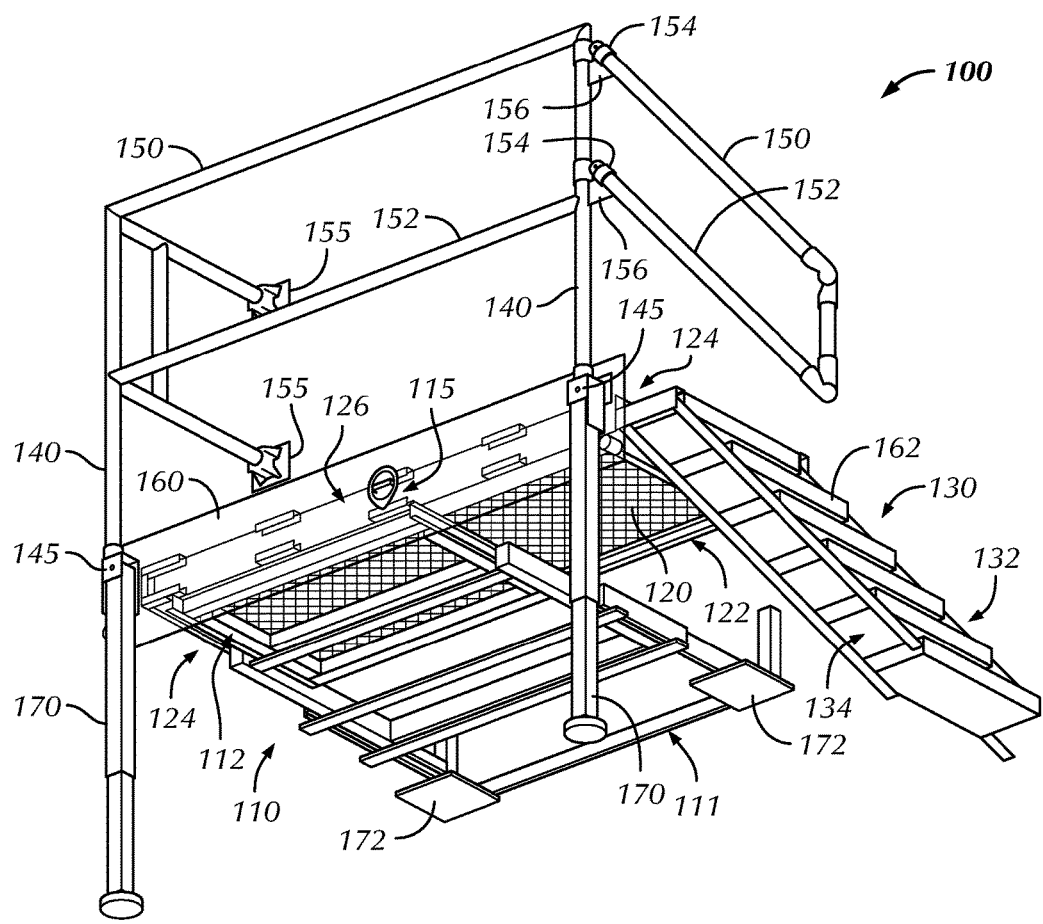
FIG. 3 shows a perspective view of a safety platform in a deployed position according to embodiments of the present disclosure.

Referring now to FIG. 3, a perspective view of a safety platform 100 in a deployed position in accordance with embodiments of the present disclosure is shown. As shown in FIG. 3, safety platform 100 includes at least one sliding frame 110 having a distal end 111 and a proximal end 112 opposite the distal end 111. The distal end 111 may be capable of attaching to a unit 172 such that the safety platform 110, when in a deployed position, may be used to access an elevated space of the attached unit 172. For example, the distal end 111 may be attached to the chassis of a mobile trailer unit 172 such that when safety platform 100 is in a deployed position, a user of safety platform 100 may access a doorway of the mobile trailer unit 172 elevated above grade. In some embodiments, a safety platform 100 may be attached to a unit 172 via a plurality of sliding frames 110, for example, two sliding frames 110 may be positioned such that one or more distal end 111 may be attached to a unit 172. The proximal end 112 may be capable of sliding towards and away from the distal end 111 such that the sliding frame 110 is fully extended when the proximal end 112 is furthest from the distal end 111 and the sliding frame 110 is fully compressed when the proximal end 112 is closest to the distal end 111. In some embodiments, the sliding frame 110 may slide using rails, rollers, telescoping components, or any other components capable of sliding between a compressed and an extended position. The sliding frame 110 may be formed from a metallic material such as steel, aluminum, alloys thereof, or any material suitable for forming a sliding frame.

In some embodiments, the sliding frame 110 may include at least one stop (not shown) to prevent the sliding frame 110 from sliding past the stop. In such embodiments, sliding frame 110 may include a plurality of stops corresponding to the sliding frame 110 being in a fully compressed position, a fully extended position, or an intermediate position between the fully compressed position and the fully extended position. The sliding frame 110 may further include a locking mechanism 115 capable of securing the sliding frame 110 in a fully compressed position, a fully extended position, or a position between the fully compressed and fully extended positions. In some embodiments, the locking mechanism 115 may operatively connect to the plurality of stops such that when the locking mechanism 115 is actuated the plurality of stops is actuated thereby securing the sliding frame 110. In such embodiments, when the locking mechanism 115 is released the plurality of stops is released thereby allowing the sliding frame 110 to slide. As shown in FIG. 3, the locking mechanism 115 may be formed having a D-ring accessible by a user at the proximal end 112 of the sliding frame to actuate and/or release the plurality of stops.

According to embodiments of the present disclosure, safety platform 100 may include a deck 120 forming a substantially horizontal surface a user of safety platform 100 may stand and/or walk on. The deck 120 may be used to enter and exit a door way of unit 172, whereby the doorway may be elevated above grade. Deck 120 as shown in FIG. 3 is not intended to be limited with respect to a particular size or set of dimensions and may vary in size and/or dimensions in one or more embodiments. The deck 120 may be formed integral with the proximal end 112 of the sliding frame or formed separately from the proximal end 122 of the sliding frame 110 and attached thereto using welding, threaded connections, or other methods known in the art to attach a deck to a frame. If the deck 120 is formed separately from the proximal end 112 of the sliding frame, the deck 120 may be formed from a material similar to the sliding frame 110 material, for example, the deck 120 may be formed from a metallic material such as steel, aluminum, alloys thereof, or any material suitable for forming a deck. According to some embodiments of the present disclosure, deck 120 may include a coating on at least a top surface of deck 120, the coating formed from a plastic, composite, or any material suitable for forming a non-slip coating on a deck.

As shown in FIG. 3, the deck 120 may be attached to a top surface of proximal end 112 such that the deck 120 slides with the proximal end 112. In other embodiments, deck 120 may be attached to a bottom surface or side surface of proximal end 122 such that deck 120 may be capable of sliding with the proximal end 112. In some embodiments, deck 120 may be attached to a plurality of sliding frames 110, for example, two sliding frames 110 may be positioned such that each proximal end 112 may be attached to deck 120. According to embodiments of the present disclosure, deck 120 may be formed having a plurality of sides including at least a rear side 122 closest to the distal end 111 of the sliding frame, and at least one deck side 124 adjacent the rear side 122. The at least one deck side 124 furthest from the rear side 122 is the front side 126. In some embodiments, as shown in FIG. 3, the deck 120 is shown having a rectangular shape and including two deck sides 124, each deck side 124 adjacent to the rear side 122, and a front side 126 that is furthest from the rear side 122. In other embodiments, deck 120 may have a semicircular shape, triangular shape, pentagonal shape, or any polynomial shape. For example, a deck 120 having a semicircular shape includes one deck side 124 extending from the ends of rear side 122 wherein the one deck side 124 is also the front side 126.

According to embodiments of the present disclosure, safety platform 100 may include a stair, ladder, or ramp 130 operatively connected to at least one deck side 124. According to embodiments of the present disclosure, a user may ascend and descend, i.e. move up and down, a stair, ladder, or ramp 130 onto deck 120 to enter or exit a doorway of unit 172. In one or more embodiments, when deployed, the top of a stair, ramp, or ladder 130 is coupled to deck 120. In such embodiments, a user may turn his or her body in a direction suitable for entering or exiting a doorway of unit 172, either before or after making contact with a stair, ladder, or ramp 130 and deck 120. For example, to use safety platform 100 to enter a doorway of unit 172, the user, from ground level, may ascend stair, ladder, or ramp 130 onto deck 120 and turn his or her direction towards the doorway entrance. Upon exiting a doorway of unit 172, the user may step out of the doorway of unit 172 onto deck 120, and turn to descend a stair, ladder, or ramp 130 to reach ground level. Alternatively, in one or more embodiments, a stair, ladder, or ramp 130 when deployed may be coupled to deck 120 such that the stair, ladder, or ramp 130 is placed to the front of a doorway of unit 172, and not to the side of the doorway of unit 172 as shown in FIGS. 1 and 2.

In some embodiments, the stair, ladder, or ramp 130 may be capable of moving between a stowed position and a deployed position. The stair, ladder, or ramp 130 may include an inner side 132 that faces the unit 172 to be accessed via safety platform 100, and an outer side 134 opposite the inner side 132. In some embodiments, the stair, ladder, or ramp 130 may slidingly engage with at least one deck side 124 such that the stair, ladder, or ramp 130 may move from a stowed position adjacent a top surface or a bottom surface of the deck 120, however, still within a thickness of the deck 120, to a deployed position such that the stair, ladder, or ramp 130 extends to grade or a distance towards grade. In such embodiments, the inner side 132 and/or the outer side 134 of the stair, ladder, or ramp 130 may include rails, rollers, telescoping components, or any other components capable of slidingly engaging with a corresponding surface of the at least one deck side 124. In some embodiments, the stair, ladder, or ramp 130 may be collapsible such that the profile of the stair, ladder, or ramp 130 becomes slimmer thereby allowing for a more compact stair, ladder, or ramp 130 when in the stowed position.

Figure 4:
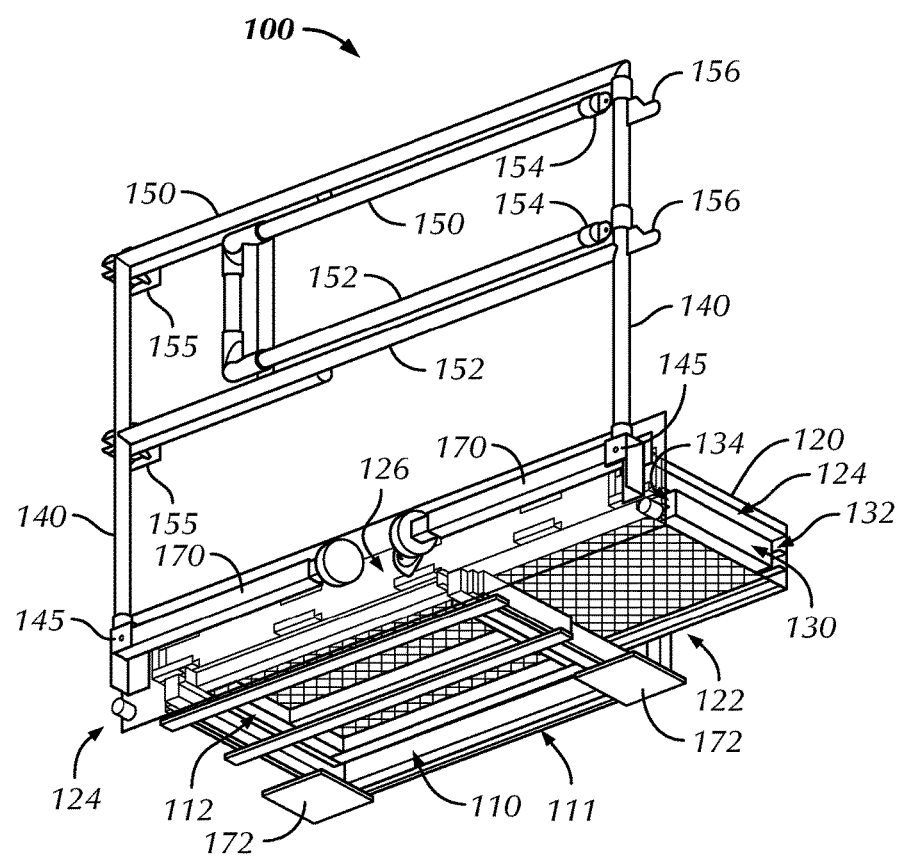
FIG. 4 shows a perspective view of a safety platform in a stowed position according to embodiments of the present disclosure.

In some embodiments, as shown in FIGS. 3 and 4, the inner side 132 and/or the outer side 134 of the stair, ladder, or ramp 130 may slidingly engage with an inner surface of the front side 126 and/or the rear side 122 of the deck below a top surface of the deck 120 such that the stair, ladder, or ramp 130 may stow under a top surface of the deck 120. The stair, ladder, or ramp 130 may be formed from a material similar to the deck 120 material, for example, the stair, ladder, or ramp 130 may be formed from a metallic material such as steel, aluminum, alloys thereof, or any material suitable for forming a stair, ladder, or ramp. According to some embodiments of the present disclosure, stair, ladder, or ramp 130 may include a coating on at least a top surface of stair, ladder, or ramp 130, the coating formed from a plastic, composite, or any material suitable for forming a non-slip coating on a stair, ladder, or ramp.

Figure 5:
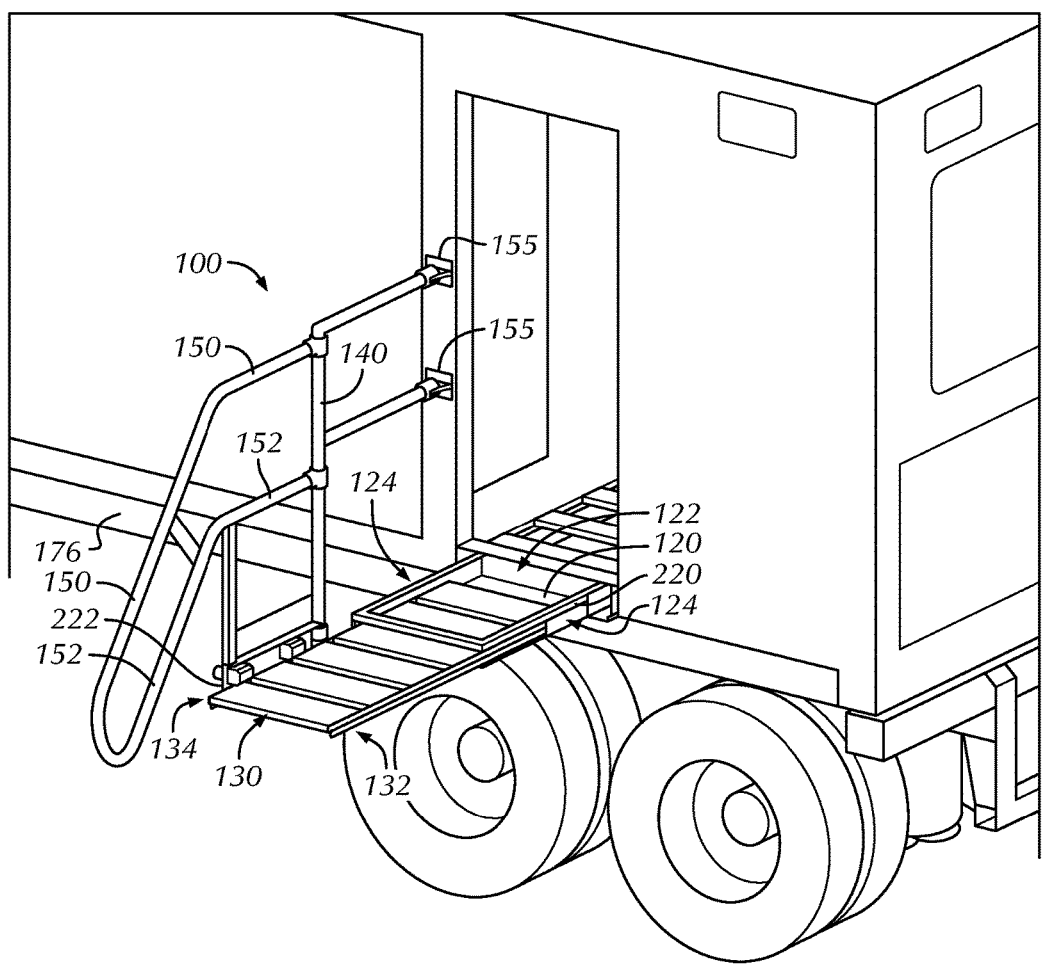
FIGS. 5 and 6 show a perspective view of a stair, ladder, or ramp according to embodiments of the present disclosure.
Figure 6:
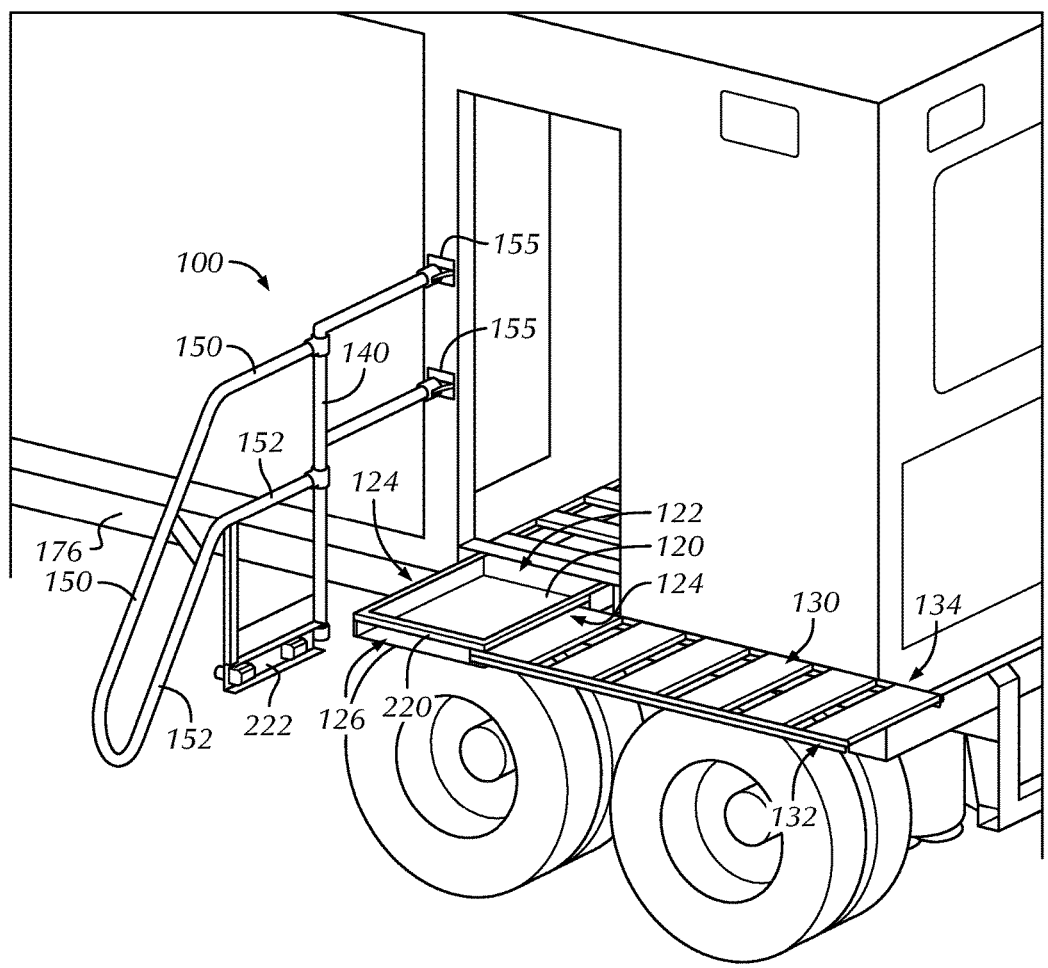

In other embodiments, as shown in FIGS. 5 and 6, the inner side 132 and/or the outer side 134 of the stair, ladder, or ramp 130 may slidingly engage with at least one deck side 124 above a top surface of the deck 120 such that the stair, ladder, or ramp 130 may stow above a top surface of the deck 120. In such embodiments, the stair, ladder, or ramp 130 may be capable of pivoting from one deck side 124 to an adjacent deck side 124 when the stair, ladder, or ramp 130 is between a stowed position and a deployed position.

As shown in FIG. 5 and FIG. 6, in one or more embodiments, a catch 176 may be coupled to a surface of unit 172. A catch, similar to catch 176 as shown in FIG. 5 and FIG. 6, may be included along a surface of unit 172 in any of the embodiments described herein. Catch 176 may facilitate securing components of the safety platform 100 in order to remain in a fixed position when safety platform 100 is stowed and/or while unit 172 is being transported. Catch 176 may protrude a short distance from an outer surface of unit 172, and may be an attachment point for one or more components of safety platform 100. In one or more embodiments, vertical post member 140 may attach to catch 176 when in a stowed position via a pin member (not shown). In one or more alternative embodiments, vertical post member 140 may be connected to catch 176 by snapping into catch 176 and/or fitting into a shape of catch 176. Catch 176 may provide a secure point of attachment of components of safety platform 100 when stowed against a side of unit 172. In one or more embodiments, such components may include vertical post member 140 and the other attached safety components rotatably secured to vertical post member 140, including, without limitation, handrail 150 and midrail 152.

According to embodiments of the present disclosure, safety platform 100 may include at least one vertical post member 140 operatively connected to the deck 120. In some embodiments, the at least one vertical post member 140 may be proximate an outer edge of the at least one deck side 124 and/or the front side 126. In some embodiments, as shown in FIG. 3, safety platform 100 may include a vertical post member 140 proximate each intersection of deck sides 124, 126. The at least one vertical post member 140 may be attached to the deck 120 using welding, threaded connections, or other methods known in the art to attach a vertical post member to a deck. As shown in FIG. 3, the at least one vertical post member 140 may be operatively connected to the deck 120 via bracket 145 secured to the front side 126 of the deck.

According to embodiments of the present disclosure, safety platform 100 may include a handrail 150 operatively connected to the at least one vertical post member 140. The handrail 150 may be capable of extending, substantially horizontally and a vertical distance above the deck 120 proximate an outer edge of the at least one deck side 124 and/or the front side 126. In some embodiments, a midrail 152 may be operatively connected to the at least one vertical post member 140 at a distance below the handrail 150 and extend underneath the handrail 150. In some embodiments, the handrail 150 and the midrail 152 may not extend along a portion of the at least one deck side 124 operatively connected to the stair, ladder, or ramp 130 when the stair, ladder, or ramp 130 is in a deployed position such that between the inner side 132 and the outer side 134 of the stair, ladder, or ramp 130 is unobstructed. In some embodiments, an end of the handrail 150 and an end of the midrail 152 may include at least one mount 155 capable of rotatably securing the handrail 150 and the midrail 152 to the unit 172, for example, via a threaded connection through mount 155.

In some embodiments, as shown in FIG. 3, a portion of the handrail 150 and/or a portion of the midrail 152 may be capable of extending from the at least one vertical post member 140 and towards grade along the outer side 134 and/or the inner side 132 of the stair, ladder, or ramp 130 such that the portion of the handrail 150 and/or the portion of the midrail 152 is located a distance above the stair, ladder, or ramp 130. In such embodiments, as shown in FIGS. 3 and 4, the portion of the handrail 150 and/or the portion of the midrail 152 may be able to rotate about the at least one vertical post member 140 via pivot bracket 154. In some embodiments, at least one flange member 156 may be attached to the at least one vertical post member 140 such that each of the at least one flange member 156 is capable of supporting the portion of the handrail 150 and/or the portion of the midrail 152 when deployed to a position along the outer side 134 and/or the inner side 132 of the stair, ladder, or ramp 130.

In other embodiments, as shown in FIGS. 5 and 6, deck 120 may include a raised frame 220 such that the stair, ladder, or ramp 130 may move into a stowed position between a top surface of the deck 120 and a top surface of the raised frame 220. In some embodiments, the at least one vertical post member 140 and/or a portion of the handrail and the midrail 150, 152 may be operatively connected to frame bracket 222. In such embodiments having a raised frame 220, the frame bracket 222 may be capable of securing to a portion of the raised frame 220 and/or at least one deck side 124 such that a portion of the frame bracket 222 is between the raised frame 220 and a top surface of deck 120. As shown in FIGS. 5 and 6, the frame bracket 222 is capable of securing to the raised frame 220 and the front side 126 of deck 120. In such embodiments, frame bracket 222 may be sized and positioned to fill in an opening that exists between the raised frame 220 and a top surface of deck 120, shown in FIG. 6. Frame bracket 222 may be sized and positioned to act as a support member between the raised frame 220 and top surface of deck 120. In some embodiments, a frame bracket 222 may be disposed at one or more positions along the width of the frame 220. For example, a single frame bracket 222 may be disposed centrally along the width of the deck to support the top surface. Likewise, as illustrated, two frame brackets may be disposed along the width of the deck to support the top surface. In other embodiments, three or more frame brackets 222 may be used for support, and may depend on the overall size of the platform, width of the ladder or stairs, as well as the configuration of the deck with respect to ladder/stair stowage position and deployed position, among other factors.

Figure 7:
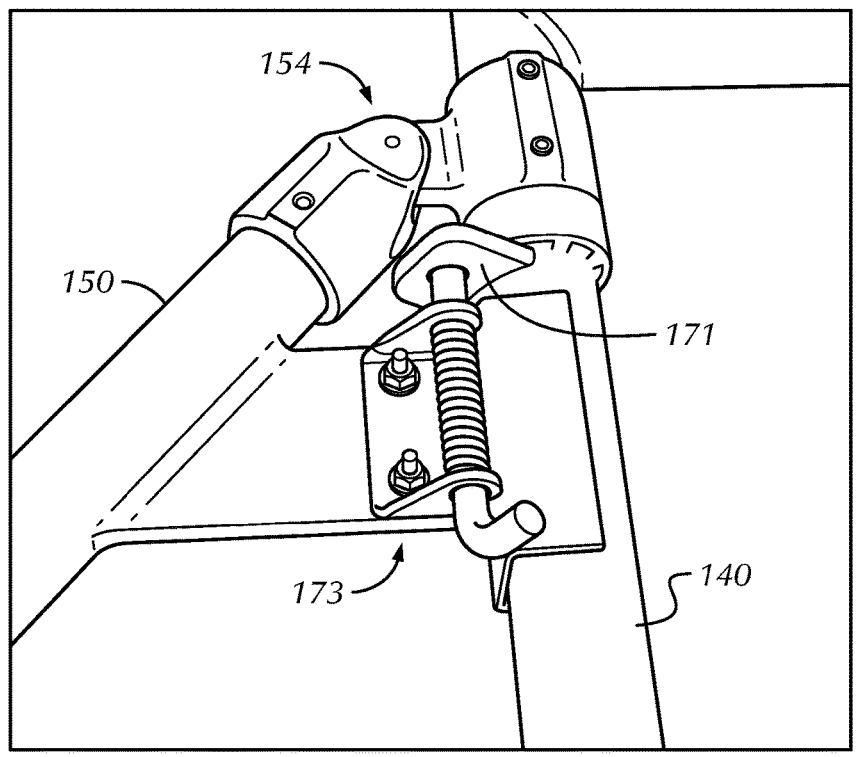
FIGS. 7 and 8 show a perspective view of a handrail and vertical post member according to embodiments of the present disclosure.
Figure 8:
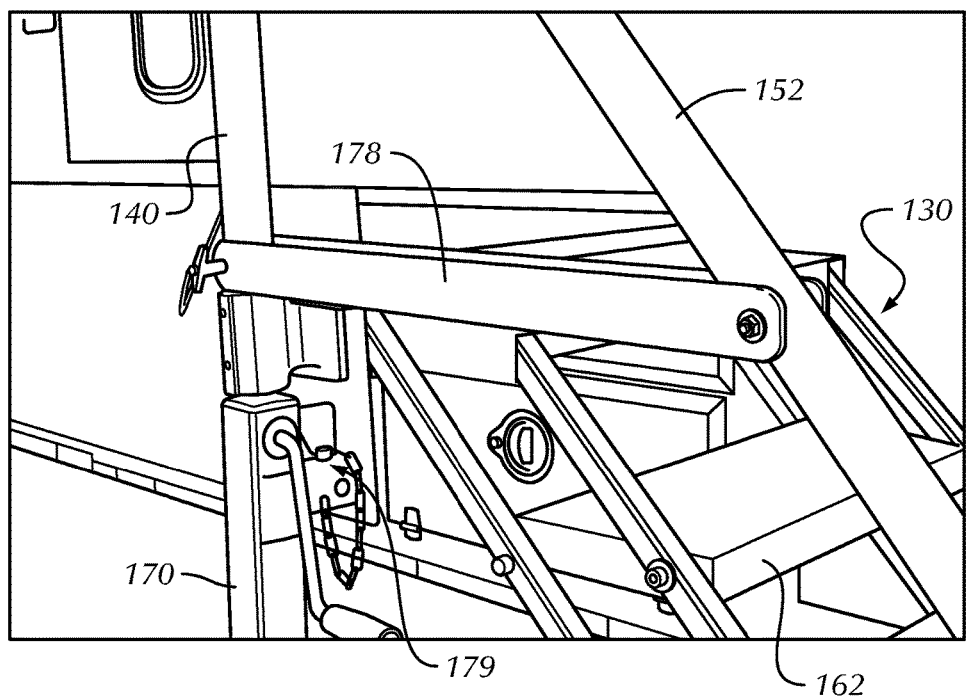

In other embodiments, as shown in FIG. 7, at least one lock pin 173 may be attached to the portion of the handrail 150 and/or the portion of the midrail 152 such that when the portion of the handrail 150 and/or the portion of the midrail 152 is deployed to a position along the outer side 134 and/or the inner side 132 of the stair, ladder, or ramp 130, the lock pin 173 may be inserted through a hole or opening in a tab 171 attached to the at least one vertical post member 140 to secure the portion of the handrail 150 and/or the portion of the midrail 152 in a deployed position. In some embodiments, as shown in FIG. 8, a crossbar 178 may be operatively connected to the portion of the handrail 150 or the portion of the midrail 152 such that the crossbar 178 may pivot. There may be a hole or opening in each of a side of the at least one vertical post member 140 and the crossbar 178 proximate an end opposite the end operatively connected to the portion of the handrail 150 and/or the portion of the midrail 152, such that each of the holes or openings may align when an end of the crossbar 178 is pivoted adjacent to the at least one vertical post member 140.

According to embodiments of the present disclosure, an upper surface of the handrail 150 may have a vertical height ranging from about 36 inches to about 48 inches above a top surface of the deck 120. In such embodiments, the midrail 152 may be located substantially equidistant between an upper surface of the handrail 150 and a top surface of the deck 120. The portion of the handrail 150 capable of extending from the at least one vertical post member 140 and towards grade along the outer side 134 and/or the inner side 132 of the stair, ladder, or ramp 130 may have an upper surface having a vertical height ranging from about 30 inches to about 36 inches above a top surface of the stair, ladder, or ramp 130. In such embodiments, the midrail 152 may be located substantially equidistant between an upper surface of the handrail 150 and a top surface of the stair, ladder, or ramp 130. In some embodiments, the handrail 150 and the midrail 152 may have a circular cross-section having an outer diameter ranging from about 1 inch to about 3 inches. In other embodiments, the handrail 150 and the midrail 152 may have a rectangular cross-section having sides ranging from about 1 inch to about 3 inches in width. In some embodiments, the handrail 150 and the midrail 152 may be solid through the cross-section. In other embodiments, the handrail 150 and the midrail 152 may be hollow along a longitudinal axis thereof and have a wall thickness ranging from about ⅛ inches to about ½ inches. The handrail 150 and the midrail 152 may be formed from steel, aluminum, alloys thereof, or any material suitable for forming a railing.

According to embodiments of the present disclosure, safety platform 100 may include a toeboard 160. Toeboard 160 may be operatively connected proximate an outer edge of the at least one deck side 124 and/or the front side 126 and extend a vertical distance from deck 120. In some embodiments, the toeboard 160 may be continuous along the at least one deck side 124 and/or the front side 126. In other embodiments, the toeboard 160 may include a plurality of sections such that an individual section of toeboard 160 may be operatively connected to each of the at least one deck side 124, 126. In some embodiments, toeboard 160 may be capable of moving from a vertical position to a non-vertical position, for example, via a hinged connection or any rotatable connection, such that toeboard 160 may move to a position adjacent a surface of the at least one deck side 124 and/or the front side 126.

According to some embodiments, toeboard 160 may have a height ranging from about 1 inch to about 6 inches from an upper surface of the toeboard 160 to a top surface of the deck 120. In some embodiments, there may be a vertical clearance between a top surface of the deck 120 and a lower surface of the toeboard 160; however, it may be beneficial that the clearance not exceed ½ inches in height to prevent objects including a user of safety platform 100 from passing through the clearance and falling to grade, for example. The toeboard 160 may be formed from steel, aluminum, alloys thereof, or any material suitable for forming a toeboard. In some embodiments, the toeboard 160 may be a continuous surface, i.e., there are no holes or openings through the toeboard 160. In other embodiments, the toeboard 160 may have a plurality of holes or openings therethrough.

According to embodiments of the present disclosure, safety platform 100 may include a toeplate 162. Toeplate 162 may be operatively connected to at least the outer side 134 and/or the inner side 132 of the stair, ladder, or ramp 130 and extend a vertical distance from a top surface of the stair, ladder, or ramp 130. In such embodiments, the stair, ladder, or ramp 130 may also include toeplate 162 between the inner side 132 and the outer side 134, such as along a width of individual steps of a stair, as shown in FIG. 8. In some embodiments, the toeplate 162 may be fixed in a position corresponding to vertical with respect to grade when the stair, ladder, or ramp 130 is in a deployed position.

According to some embodiments, toeplate 162 may have a height ranging from about ¼ inches to about 2 inches from an upper surface of the toeplate 162 to a top surface of the stair, ladder, or ramp 130. The toeplate 162 may be formed from steel, aluminum, alloys thereof, or any material suitable for forming a toeplate. In some embodiments, the toeplate 162 may be a continuous surface, i.e., there are no holes or openings through the toeplate 162. In other embodiments, the toeplate 162 may have a plurality of holes or openings therethrough.

According to some embodiments of the present disclosure, at least one support leg 170 may be operatively connected to the deck 120 and capable of extending to grade. In some embodiments, as shown in FIG. 3, the at least one support leg 170 is proximate the front side 126 of the deck and connected to the deck 120 via bracket 145. In such embodiments, the at least one support leg 170 may be rotatably connected to bracket 145 such that the at least one support leg 170 may move from a vertical position to a horizontal position adjacent to a surface of the deck 120. In some embodiments, the at least one support leg 170 may be removably attached to the deck 120, for example, via bracket 145. The at least one support leg 170 may be extendable in length. In some embodiments, the at least one support leg 170 may have a wide portion proximate its lower end, such as a footing, to increase the surface area contact with grade.

In operation, a user of the safety platform 100 may deploy the safety platform from a stowed position to a deployed position. The locking mechanism 115 at the proximal end 112 of the sliding frame may be actuated to release the plurality of stops of the sliding frame 110 allowing the sliding frame 110 to slide. The deck 120 may be urged outwardly from the unit 172, for example, by pulling a handle (not shown) operatively connected to the front side 126, until the deck 120 is fully deployed corresponding to the sliding frame 110 being fully extended. In some embodiments, the sliding frame 110 may slide between a compressed and an extended position mechanically, pneumatically, hydraulically, electronically, and/or magnetically using systems known in the art of sliding frames.

In some embodiments, the at least one support leg 170 may be secured in a horizontal (stowed) position or, as shown in FIG. 8, in a vertical (deployed) position via pin member 179 inserted through a hole or opening in a portion of the at least one support leg 170. The pin member 179 may be released to allow the at least one support leg 170 to move from a horizontal (stowed) position to a vertical (deployed) position. The at least one support leg 170 may be extended until making contact with grade. In such embodiments, the at least one support leg 170 may include a pin and hole system, a crank, a motor, or any other suitable method of selectively varying the length of the at least one support leg 170.

The toeboard 160 along an outer edge of the at least one deck side 124 and/or the front side 126 may be moved from a non-vertical (stowed) position to a vertical (deployed) position if capable of moving between said position such as via hinged connection or any rotatable connection. The toeboard 160 may include a plurality of angled holes or openings (not shown) proximate the edges between the at least one deck side 124 and/or the front side 126 such that the pin member 179, or any other element capable of passing through the plurality of angled holes or openings, may be inserted through the angled holes or openings to secure the toeboard 160 in a vertical position.

The handrail 150 and the midrail 152 may be extended along an outer edge of the at least one deck side 124 and/or the front side 126. In some embodiments, a portion of the handrail 150 and/or a portion of the midrail 152 may be extended along the outer side 134 and/or the inner side 132 of the stair, ladder, or ramp 130. In some embodiments, an end of the handrail 150 and/or an end of the midrail 152 may be secured to the unit 172 via mount 155. In some embodiments, the lock pin 173, shown in FIG. 7, may be inserted through a hole or opening in a tab 171 attached to the at least one vertical post member 140 to secure the portion of the handrail 150 and/or the portion of the midrail 152 in a deployed position along the outer side 134 and/or the inner side 132 of the stair, ladder, or ramp 130. In some embodiments, the crossbar 178, shown in FIG. 8, may be pivoted adjacent to the at least one vertical post member 140 such that another pin member similar to pin member 179 may be inserted through the crossbar 178 and the at least one vertical post member 140.

The stair, ladder, or ramp 130 may be urged from the stowed position to the deployed position such that the stair, ladder, or ramp 130 extends to grade or a distance towards grade. In some embodiments, the stair, ladder, or ramp 130 may be deployed mechanically, pneumatically, hydraulically, electronically, and/or magnetically using systems known in the art of moving a stair, ladder, or ramp from a stowed position to a deployed position. One having ordinary skill in the art would understand that the safety platform 100 may be moved from a deployed position to a stowed position in operation reverse of the described operation of moving the safety platform 100 from a stowed position to a deployed position.

In addition to providing safe access and egress from an elevation above grade, either a portion of or the entirety of safety platform 100 may be capable of stowing compactly with a unit 172 to be accessed via safety platform 100 within an opening, shown as opening 102 in FIG. 1, in the unit 172 to receive safety platform 100 in its stowed position. Compact stowage of safety platform 100 with the unit 172 may include minimizing the height and width of the opening in the unit 172 and/or minimizing the distance between an outer surface of the unit 172 and an outer surface of safety platform 100 as measured from the unit 172. Stowing safety platform 100 with a unit 172 to be accessed via safety platform 100 compactly may reduce impacts to a safety platform and facilitate transportation of the unit 172, for example, a mobile trailer unit driving on the road.

In some embodiments, the opening in the unit 172 to receive safety platform 100 in a stowed position may have a height and width corresponding to the deck 120. In such embodiments, the toeboard 160 connected to the deck 120 may be capable of moving from a vertical (deployed) position to a non-vertical (stowed) position, for example, via a hinged connection or any rotatable connection, such that toeboard 160 may move to a position adjacent a surface of the deck 120 such that the height and width of the deck 120 with the toeboard in a stowed position is substantially the same size as the opening in the unit 172 thereby allowing the deck 120 to slide through the opening in the unit 172 with the toeboard 160 in a stowed position. The opening in the unit 172 may extend far enough within the body of the unit 172 below a floor of unit 172 that the deck 120 and any components folded on or about deck 120 may completely fit within the opening in unit 172.

Figure 9:
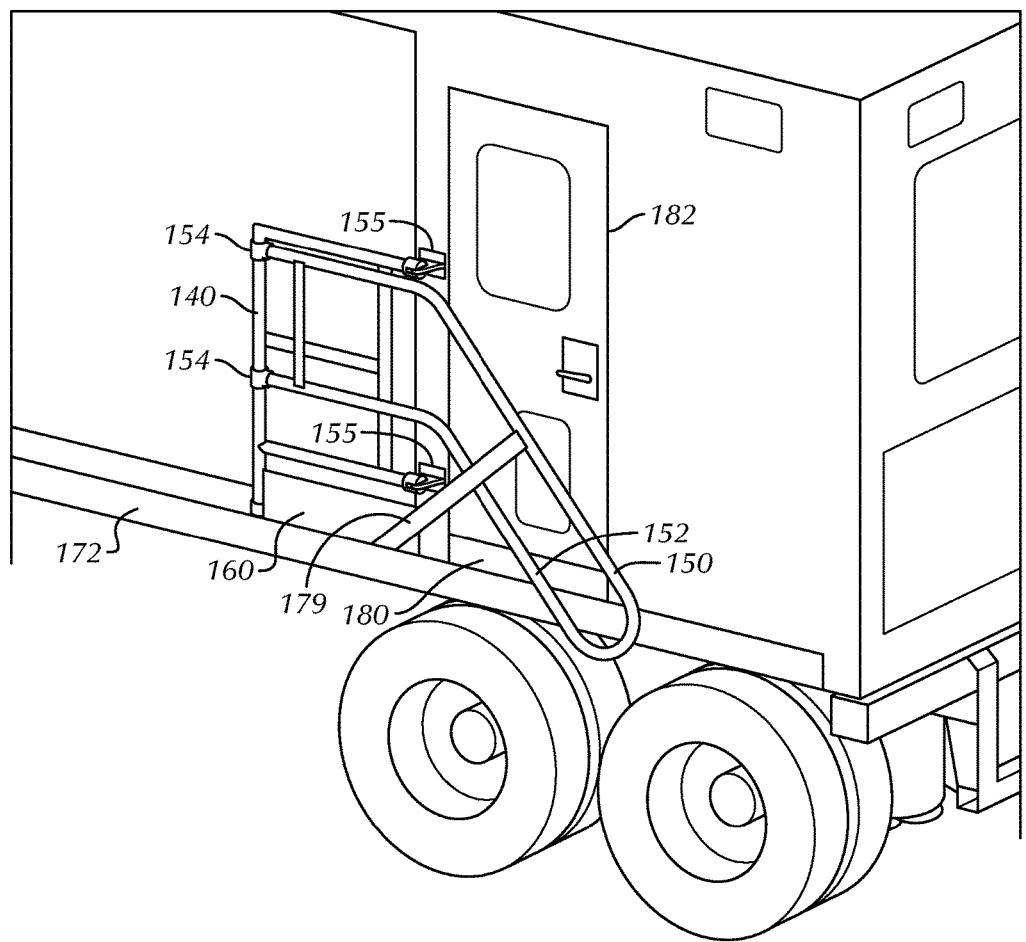
FIG. 9 shows a perspective view of a safety platform in a stowed position according to embodiments of the present disclosure.
Figure 10:
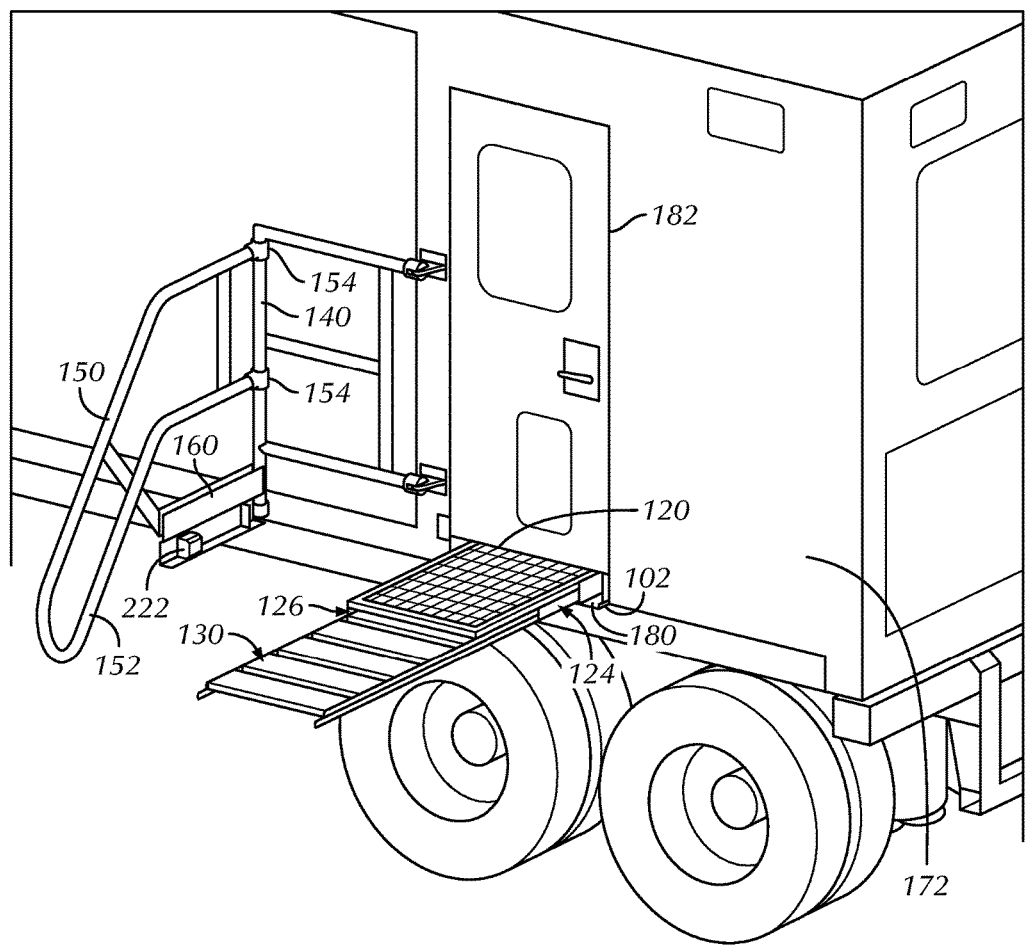
FIGS. 10 and 11 show a perspective view of a safety platform in a semi-deployed and deployed position according to embodiments of the present disclosure.
Figure 11:
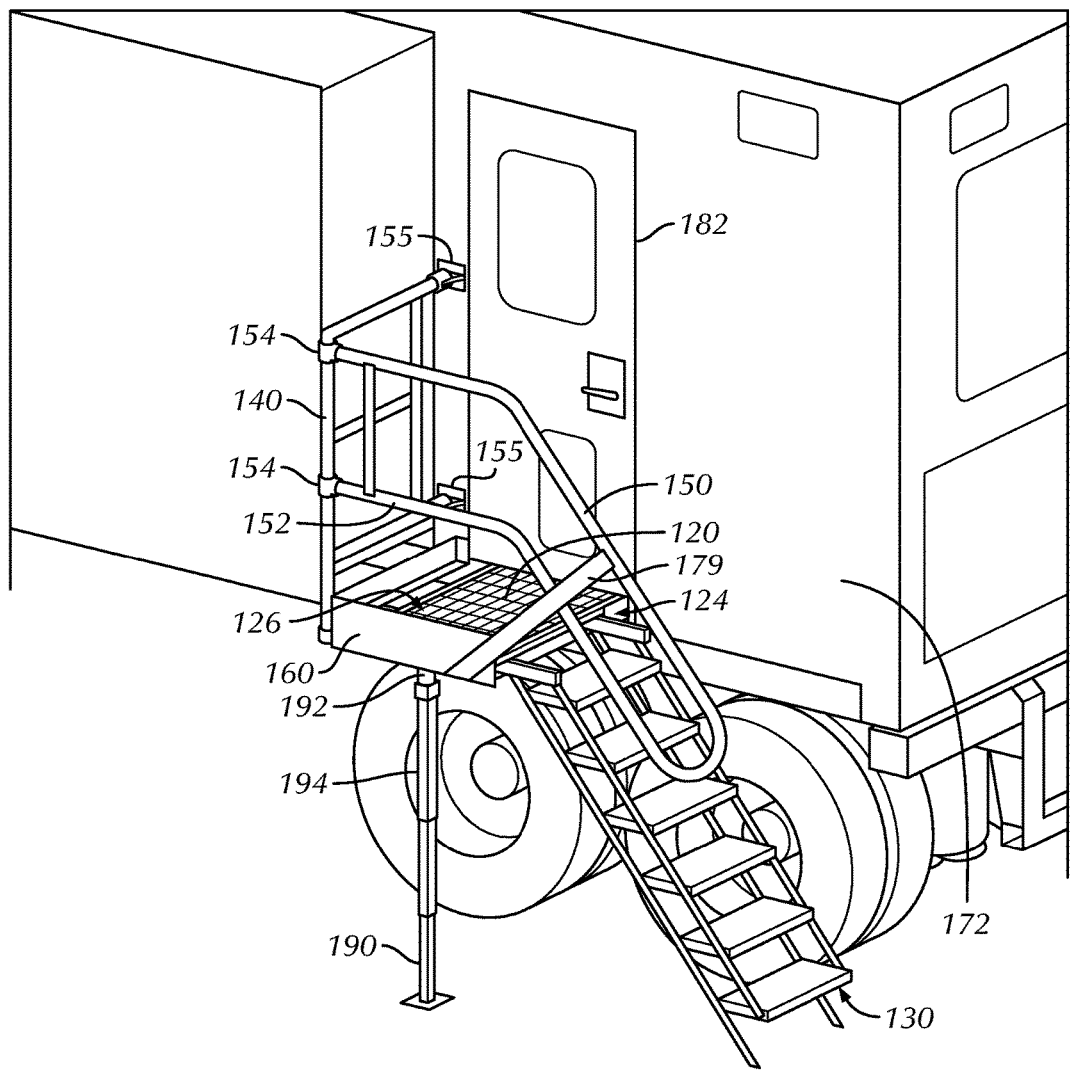

FIG. 2 shows that when deck 120 is in a stowed position the height and width of the deck 120 with the toeboard 160 covers opening 102 in unit 172. As an alternative embodiment, FIGS. 9-11 show a panel 180 may be coupled to a surface of the unit 172 so as to cover an opening when deck 120 and attached stair, ladder, or ramp 130 are stowed within the opening. Deck 120 and attached stair, ladder, or ramp 130 may be stowed separately or together in one or more embodiments within opening 102 in unit 172. In FIG. 9, panel 180 covers the opening that is located beneath door 182 of unit 172. As shown in FIG. 10, when a user acts to extract the stowed deck 120 and attached stair, ladder, or ramp 130 from within the opening, panel 180 is flipped in a downwards direction away from the surface of unit 172, thereby partially revealing opening 102. In one or more embodiments, panel 180 may be opened by a handle (not shown) for manually pulling open panel 180. Panel 180 may also be opened mechanically, pneumatically, hydraulically, electronically, and/or magnetically using systems known in the art of opening panels.

As previously discussed, the stair, ladder, or ramp 130 may move to a stowed position adjacent a top surface or a bottom surface of the deck 120, however, still within the thickness of the deck 120 thereby allowing the deck 120 to slide through the opening in the unit 172 with the stair, ladder, or ramp 130 in a stowed position.

In some embodiments, as shown in FIGS. 3 and 4, portions of the handrail 150 and the midrail 152 are capable of folding compactly and adjacent to the handrail 150 and the midrail 152 extending along the front side 126. In some embodiments, a portion of the handrail and the midrail 150, 152 may be rotatably secured to the unit 172 at mount 155. In such embodiments, the portion of the handrail and midrail 150, 152 rotatably secured to the unit 172 may fold to a stowed position adjacent to an inner surface of the handrail 150 and the midrail 152 extending along the front side 126 (FIG. 4). Similarly, in some embodiments, a portion of the handrail and the midrail 150, 152 may be able to rotate about the at least one vertical post member 140 via pivot bracket 154 and extend along the outer side 134 and/or the inner side 132 of the stair, ladder, or ramp 130. In such embodiments, the portion of the handrail and the midrail 150, 152 capable of extending along the outer side 134 and/or the inner side 132 of the stair, ladder, or ramp 130 may fold to a stowed position adjacent to an outer surface of the handrail 150 and the midrail 152 extending along the front side 126 (FIG. 4). In some embodiments, pivot bracket 154 may be located on the at least one vertical post member 140 between the handrail 150 and the midrail 152 such that the portion of the handrail and the midrail 150, 152 capable of extending along the outer side 134 and/or the inner side 132 of the stair, ladder, or ramp 130 may fold to a stowed position between the handrail 150 and the midrail 152 extending along the front side 126 (FIG. 4).

In such embodiments, the handrail and midrail 150, 152 when folded in a stowed position may have a thickness ranging from about 1 diameter to about 2 diameters of the handrail 150 and/or midrail 152 as measured outwardly from the front side 126. Accordingly, when the deck 120 is slidingly moved through the opening in the unit 172 to a stowed position, the handrail and midrail 150, 152 when folded in a stowed position may protrude a distance ranging from about 1 diameter to about 2 diameters of the handrail 150 and/or midrail 152.

FIG. 9 shows an alternate embodiment for a safety platform configured for accessing and egressing a doorway of unit 172. FIG. 9 shows such a safety platform in a stowed position. Deck 120 and attached stair, ladder, or ramp 130 are hidden from view behind panel 180 and within an opening 102 that extends through a body of unit 172. Deck and attached stair, ladder, or ramp 130 are stowed within opening 102 behind panel 180 and stowed separate from handrail 150, midrail 155, and vertical post member 140. Handrail 150, midrail 155, vertical post member 140 are substantially flush with an outer surface of unit 172 in the stowed position. An end of handrail 150 and midrail 150 that is proximate to an outer surface of unit 172 is rotatably secured to mounts 155. In FIG. 9, cross bar 179 may be secured at one end of a lower portion of toeboard 160 and connected to handrail 150.

FIG. 10 shows a perspective view of the safety platform embodiment shown in FIG. 9. Deck 120 has been fully extended in FIG. 10. In one or more embodiments, a plurality of locks (not shown) located beneath a bottom surface of deck 120 may act to secure deck 120 in place when fully deployed, without prohibiting that stair, ladder, or ramp 130 pivot adjacent to a side of deck 120, such as deck side 124. In FIG. 10, the stair, ladder, or ramp 130 is shown extending a distance from deck 120, prior to rotation and deployment to grade. FIG. 11 shows a perspective view of deck 120 fully extended, with stair, ladder, or ramp 130 also fully extended towards grade such that both deck 120 and stair, ladder, or ramp 130 are fully deployed. FIG. 10 further shows frame bracket 222 which may be inserted into an opening that occurs between a top surface of deck 120 and a lower surface of an underlying frame of deck 120 when stair, ladder, or ramp 130 is rotated adjacent to a side 124 of deck 120.

FIGS. 9-11 further include a pivot bracket 154 which allows a portion of the handrail and the midrail 150, 152 to rotate about the at least one vertical post member 140 from a stowed to deployed position. In some embodiments, and as shown in FIG. 11, a portion of the handrail and the midrail 150, 152 may be able to rotate about the at least one vertical post member 140 via pivot bracket 154 and extend along the outer side 134 and/or the inner side 132 of the stair, ladder, or ramp 130 when fully deployed. Pivot bracket 154 functions to allow handrail and midrail 150, 152 to be positioned at different locations depending on whether the handrail, midrail 150, 152 is stowed, deployed, or in between the stage of being stowed or fully deployed. Other means of pivoting and folding in portions of handrail and midrail 150, 152 may be used, including, without limitation, a cantilever bracket that may also employ cantilever arms to pivot and fold handrail and midrail 150, 152 inwardly or outwardly from a unit 172.

In some embodiments, the at least one support leg 170 may be rotatably connected to bracket 145 such that the at least one support leg 170 may move from a vertical position (deployed) to a horizontal (stowed) position adjacent a surface of the deck 120. For example, as shown in FIG. 4, the at least one support leg 170 may fold upwardly to a stowed position adjacent an outer surface of the front side 126. In such embodiments, the at least one support leg 170 when folded in a stowed position may protrude a distance outwardly from the front side 126 that is substantially the same as the thickness of the at least one support leg 170. In other embodiments, the at least one support leg 170 may be removably attached such that the distance and/or amount of components of safety platform 100 protrude from the unit 172 is minimized.

In some embodiments, the at least one support leg 170 may have a thickness ranging from about 1 diameter to about 2 diameters of the handrail 150 and/or midrail 152. Accordingly, when the deck 120 is slidingly moved through the opening in the unit 172 to a stowed position, the at least one support leg 170 when folded in a stowed position may protrude a distance ranging from about 1 diameter to about 2 diameters of the handrail 150 and/or midrail 152.

FIG. 11 shows a support leg 190. According to some embodiments of the present disclosure, support leg 190 is a vertical post member that may be operatively connected to the deck 120 and capable of extending to grade. While a single lifting support leg 190 is shown in FIG. 11, a plurality of support legs 190 may be included in this or other embodiments. In some embodiments, as shown in FIG. 11, the at least one support leg 190 is proximate the front side 126 of the deck and connected to the deck 120. Support leg 190 may be extendable in length. In some embodiments, and as shown in FIG. 11, support leg 190 may have a wide portion proximate its lower end, such as a footing or footplate, to increase the surface contact with grade. Support leg 190 may be rectangular, square, circular, or any shape.

In some embodiments, support leg 190 may be removeably attached to deck 120. As shown in FIG. 11, support leg 190 is a separate vertical post member not fixed or permanently coupled to deck 120. In FIG. 11, at the top of support leg 190 is a mounting bracket 192. A mounting surface 192, located at the very top of support leg 190 above the bracket that is visible in FIG. 11, may be removeably attached via a pin in one or more embodiments against a bottom surface of deck 120. In a retracted non-deployed position, support leg 190 may be of a shorter height than when fully extended. When support leg 190 is not located beneath deck 120, support leg 190 may be in a retracted height position. When it is desired to extend support leg 190 to its full vertical height towards grade, side wind handle 194 may be rotated a number of turns to extend support leg 190 to reach close to its full vertical height. Mounting surface 192 of support leg 190 may be removeably attached to deck 120, and subsequently, side wind handle 194 may be rotated until support leg 190 has been extended to grade to provide proper support to deck 120. Side wind handle 194 is a handle that when turned either clockwise or counterclockwise enables shortening or lengthening the height of support leg 190 and is coupled to a body of support leg 190. Alternative means of extending the height of support leg 190 may be used as envisioned by one of ordinary skill.

As shown in FIG. 11, support leg 190 may be secured to deck 120 of safety platform 100 as needed, and may be stowed separately from safety platform 100. In other embodiments, support leg 190 may be coupled to a bottom surface of deck 120 in such a manner that support leg 190 is permanently or semi-permanently attached to a bottom surface of deck 120. For example, mounting surface 192 may include one or more brackets that may be secured via bolts and/or other fasteners to a bottom surface of deck 120. Further, in other embodiments, a pivot bracket, similar to pivot bracket 154, may be used to rotate the support leg 190 so support leg 190 may be rotatable from a horizontal stowed position beneath deck 120 to a full vertical deployed position. In such embodiments, support leg 190 may further include side wind handle 194 or similar means for extending support leg 190 between deck 120 and the ground to fix support leg 190 in place. Support leg 190 may act as a stabilizing leg to prevent weight applied to deck 120 from shifting a position and/or orientation of unit 172.

Support leg 190 may be utilized with any of the safety platforms described herein, including safety platform 100. It should be noted that safety platform 100 may be structurally sound enough to carry significant loads and/or weight without necessarily utilizing support leg 190. The materials utilized to manufacture safety platform 100, for example, steel or similar hard metals, and construction methods of forming safety platform 100 should enable safety platform 100 to withstand significant loads and/or weight. Nevertheless, support leg 190 may be beneficial for stabilizing unit 172 so that when one or more persons and/or objects is located on deck 120 of safety platform 100 or moving up or down a stair, ladder, or ramp 130, the weight of the one or more persons and/or objects does not cause unit 172 to be displaced causing the unit to rock from side to side, for example.

Support leg 190 may act accordingly as a stabilizing member for stabilizing unit 172. Oftentimes, units, including mobile trailer units utilized in drilling and/or construction, have equipment, including, without limitation, satellite dishes and/or other sensitive electronic devices. If a unit is made to shift position, however slightly, the ability for any satellite dishes to receive signals and the proper operation of other sensitive electronic devices may be interrupted. In one or more embodiments, there may be at least one support leg 190 to prevent unit from rocking or shaking when weight is added to safety platform 100.

While the present disclosure has been described with respect to a limited number of embodiments, those skilled in the art, having benefit of this disclosure, will appreciate that other embodiments may be devised which do not depart from the scope of the disclosure as described herein. Accordingly, the scope of the disclosure should be limited only by the attached claims.

What is claimed is:

1. A safety platform comprising:
   a sliding frame having:
      a distal end capable of attaching to a unit; and
      a proximal end configured to slide horizontally towards and away from the distal end;
   a deck having a plurality of sides including:
      a rear side;
      a front side; and
      at least one deck side extending between the rear side and the front side;
   wherein the deck is movable between a stowed position and a deployed position, the stowed position having the front side of the deck being substantially flush with an outer surface of the unit, and the deployed position having the front side of the deck a distance from the outer surface of the unit;
   a stair, ladder, or ramp operatively connected to the at least one deck side and capable of extending therefrom, the stair, ladder, or ramp having an inner side and an outer side opposite the inner side, wherein the stair, ladder, or ramp is configured to slidingly engage with the deck, such that the stair, ladder, or ramp is capable of stowing under a top surface of the deck, and wherein the stair, ladder, or ramp is rotatable from the at least one deck side to an adjacent deck side such that the inner side of the stair, ladder, or ramp is facing the unit;

at least one vertical post member connected to the deck proximate the front side;

a handrail operatively connected to the at least one vertical post member, the handrail configured to extend along and parallel to the outer side of the stair, ladder, or ramp, and the at least one deck side, excluding a portion of the deck operatively connected to the stair, ladder, or ramp;

wherein the handrail is movable to a stowed position, the stowed position having the handrail extending along the front side of the deck with the handrail protruding from the outer surface of the unit between 1 to 2 diameters of the handrail; and a vertical toeboard operatively connected to the at least one deck side, excluding a portion of the deck operatively connected to the stair, ladder, or ramp.

2. The safety platform of claim 1, further comprising:
a midrail operatively connected to the at least one vertical post member a distance below the handrail.

3. The safety platform of claim 1, further comprising:
a locking mechanism operatively connected to the sliding frame, the locking mechanism capable of securing the deck in the stowed position and the deployed position.

4. The safety platform of claim 1, further comprising:
at least one support leg operatively connected to the deck, wherein the support leg is adjustable in length and capable of extending vertically to grade.

5. The safety platform of claim 4, wherein the at least one support leg is configured to pivot to a horizontal stowed position.

6. The safety platform of claim 1, wherein a top surface of the handrail is positioned between 36 and 48 inches from a top surface of the deck.

7. The apparatus of claim 1, wherein a top surface of the handrail is positioned between 30 and 34 inches from a top surface of the stair, ladder, or ramp.

8. The safety platform of claim 2, wherein the midrail is substantially equidistant between the handrail and either a top surface of the deck or a top surface of the stair, ladder, or ramp.

9. The safety platform of claim 1, wherein the toeboard is at least 3 inches in height and having between 0 and 0.25 inches clearance between a top surface of the deck and a bottom surface of the toeboard.

10. The safety platform of claim 1, further comprising a toeplate operatively connected to at least one of the inner side and the outer side of the stair, ladder, or ramp.

11. The safety platform of claim 1, wherein the toeboard is hingedly connected to the deck such that the toeboard is capable of swinging to be substantially flush with a surface of the deck.

12. The safety platform of claim 2, wherein a portion of the handrail and a portion of the midrail are configured to rotate about the at least one vertical post member.

* * * * *